(12) United States Patent
Barclay et al.

(10) Patent No.: US 7,570,743 B2
(45) Date of Patent: Aug. 4, 2009

(54) METHOD AND APPARATUS FOR SURVEILLANCE OF VOICE OVER INTERNET PROTOCOL COMMUNICATIONS

(75) Inventors: Deborah Lewandowski Barclay, Winfield, IL (US); David S. Benco, Winfield, IL (US); Sanjeev Mahajan, Naperville, IL (US); Thomas Lee McRoberts, Naperville, IL (US); Raymond Leroy Ruggerio, Glenview, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1366 days.

(21) Appl. No.: 10/837,088

(22) Filed: Apr. 30, 2004

(65) Prior Publication Data

US 2005/0243802 A1 Nov. 3, 2005

(51) Int. Cl.
*H04M 1/24* (2006.01)
(52) U.S. Cl. .................. 379/35; 709/224; 370/235; 379/134
(58) Field of Classification Search ............... 370/352, 370/235; 709/224; 379/35, 32.01, 32.04, 379/133, 134
See application file for complete search history.

(56) References Cited

U.S. PATENT DOCUMENTS

| 6,839,323 | B1 * | 1/2005 | Foti ........................... 370/235 |
| 6,871,229 | B2 * | 3/2005 | Nisani et al. ................. 709/224 |
| 7,092,493 | B2 * | 8/2006 | Hou et al. ...................... 379/35 |
| 7,152,103 | B1 * | 12/2006 | Ryan et al. ................... 709/224 |
| 7,277,528 | B2 * | 10/2007 | Rao et al. ................. 379/32.01 |
| 2003/0147397 | A1 * | 8/2003 | Dianda .................... 370/395.2 |
| 2003/0174695 | A1 * | 9/2003 | Lautenschlager et al. ... 370/352 |
| 2003/0215069 | A1 * | 11/2003 | Hitzeman ................. 379/88.19 |
| 2004/0008253 | A1 * | 1/2004 | Monroe ....................... 348/143 |
| 2004/0086093 | A1 * | 5/2004 | Schranz ....................... 379/37 |
| 2004/0120471 | A1 * | 6/2004 | Benco ......................... 379/35 |
| 2004/0157629 | A1 * | 8/2004 | Kallio et al. ................. 455/466 |
| 2004/0165709 | A1 * | 8/2004 | Pence et al. ............ 379/201.01 |
| 2004/0218731 | A1 * | 11/2004 | Karimi-Cherkandi et al. ........................ 379/32.01 |
| 2004/0219911 | A1 * | 11/2004 | Kouchri et al. ............... 455/423 |
| 2005/0094773 | A1 * | 5/2005 | Peterson ....................... 379/35 |
| 2005/0174937 | A1 * | 8/2005 | Scoggins et al. ............. 370/230 |
| 2005/0175156 | A1 * | 8/2005 | Afshar et al. .................. 379/35 |
| 2005/0180446 | A1 * | 8/2005 | Flowers et al. .............. 370/428 |
| 2006/0212933 | A1 * | 9/2006 | Scoggins et al. .............. 726/11 |
| 2007/0127448 | A1 * | 6/2007 | Buntin et al. ................ 370/356 |
| 2007/0211639 | A1 * | 9/2007 | Spalt ........................... 370/241 |
| 2008/0130539 | A1 * | 6/2008 | Lauer et al. .................. 370/310 |
| 2008/0212571 | A1 * | 9/2008 | Ilan et al. ..................... 370/352 |
| 2008/0285726 | A1 * | 11/2008 | Kung et al. .............. 379/32.01 |

FOREIGN PATENT DOCUMENTS

EP     1 111 892 A2    6/2001

* cited by examiner

*Primary Examiner*—Olisa Anwah

(57) ABSTRACT

A method and apparatus for surveillance of voice over Internet protocol (VoIP) communications is provided. A server (112) associated with a network provider receives information to identify communications associated with a party under surveillance (200). The server uses the information to direct communications associated with the party under surveillance to a surveillance server (130) (202). The communications are analyzed to identify any initial VoIP data (204). If initial VoIP data is detected, identifiers for subsequent related VoIP communications are determined from the initial VoIP data (206). The identifiers for subsequent VoIP communications are used to identify subsequent VoIP packets. Those subsequent VoIP packets are then stored and analyzed as needed by an agency conducting surveillance.

17 Claims, 2 Drawing Sheets

METHOD AND APPARATUS FOR SURVEILLANCE OF VOICE OVER INTERNET PROTOCOL COMMUNICATIONS

FIELD OF THE INVENTION

The present invention relates generally to voice over Internet protocol technology, and in particular, to a method and apparatus for surveillance of voice over Internet protocol communications by law enforcement organizations and the like.

BACKGROUND OF THE INVENTION

Voice over Internet protocol (VoIP) telephone services and related systems are known. Such systems allow voice calls using Internet Protocol ("IP") networks such as the Internet as an alternative to traditional public switched telephone networks ("PSTN"). Unlike the PSTN, which is circuit-switched, the Internet is packet-switched. As such, communications on the Internet is accomplished by transmitting and receiving packets of data. In addition to data, each packet contains a destination address to ensure that it is routed correctly. The format of these packets is defined by the IP. One type of allowable data is encoded, digitized voice, termed voice over IP (VoIP). VoIP is voice that is packetized as defined by the Internet protocol, and communicated over the Internet for telephone-like communication. Individual VoIP packets may travel over different network paths to reach a final destination where the packets are reassembled in correct sequence to reconstruct the voice information.

Law enforcement agencies such as the FBI (Federal Bureau of Investigation) may be authorized under court order to carry out surveillance of calls to and from a suspect party. The technology solutions for this surveillance currently only applies to circuit-switched based telephone systems. There is presently no solution that allows law enforcement agencies to effectively monitor calls made via VoIP technology. With the increased awareness of VoIP technology and available VoIP services, it has become easy for criminals to get around lawful surveillance.

Therefore, a need exists for a method and apparatus for law enforcement agencies and the like to conduct surveillance of VoIP calls.

SUMMARY OF THE INVENTION

The need is met and an advance in the art is made by the present invention, which allows surveillance of calls originated or delivered using VoIP technology. The call may originate and/or terminate on a personal computer or other VoIP terminal.

In one aspect of the present invention, surveillance of VoIP calls for a party is provided. First, a server associated with a network service provider for the party receives an identification of the party under surveillance. The identification varies based on the implementation, but the identification uniquely identifies communications directed to or from the party. The identification is, for example, a user identification or MAC address. A surveillance server receives all communications to or from the identified party. The communications are analyzed to detect if they relate to a VoIP communication. If a VoIP communication is detected, preferably by the identification of call set up messages, then identifiers for related subsequent VoIP communications are determined and used to locate further VoIP communications. Preferably, the further communications are sent to a surveillance agency for monitoring, analysis, storage and the like.

DESCRIPTION OF THE PREFERRED EMBODIMENTS

Figure 1:
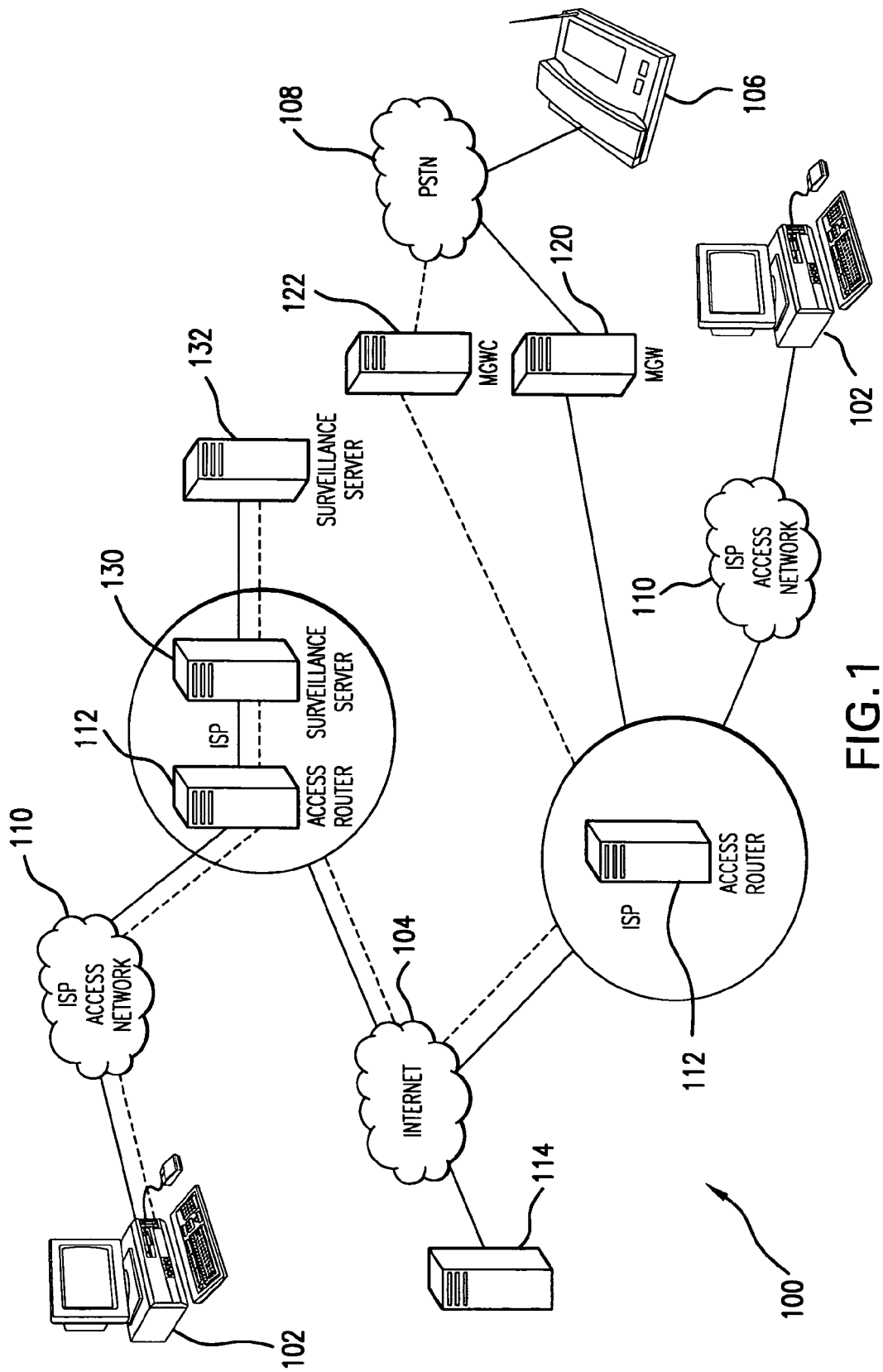
FIG. 1 is a block diagram of a communications system with capability for surveillance of voice over Internet protocol communications in accordance with the present invention.

FIG. 1 is a block diagram of a communications system 100. Communications system 100 includes apparatus for surveillance of VoIP calls in accordance with the present invention. The VoIP approach illustrated by communications system 100 is characterized by the use of a "mediating" server 114 to implement VoIP.

Communications system 100 includes multiple VoIP terminals 102. The VoIP terminals 102 in communications system 100 are shown as personal computers for convenience. Those of skill in the art will recognize that other VoIP terminals include any devices capable of attaching to the Internet and providing a voice interface, including, wireless VoIP terminals, IP telephones, and circuit phones using a VoIP service provider network and associated equipment.

VoIP terminals 102 communicate with each other over a network, such as Internet 104, using voice over Internet protocol technology. VoIP terminals 102 also communicate with standard telephones, such as telephone 106, that are coupled to a public switched telephone network 108.

In order to communicate over the Internet 104, VoIP terminals 102 are coupled to an Internet service provider (ISP) access network 110 in any known manner. The ISP access network 110 is in turn coupled to the Internet 104. One or more access routers 112 controlled by an Internet service provider provide access from the ISP access network to the Internet 104. The access routers 112 typically provide temporary IP addresses to subscribers, authenticate subscribers for access, and block or distribute traffic to internal networks.

In a common VoIP approach, a mediating server 114 is coupled to Internet 104 to facilitate VoIP communications. Mediating server 114 receives VoIP packets for VoIP conversations and correlates such packets for VoIP communications. More specifically, a port is established for outgoing and incoming communications for a VoIP terminal. One port receives all the VoIP voice packets from the VoIP terminal, while the other sends the VoIP voice packets received from the far end and corresponding to this session to the VoIP terminal. Hence, all VoIP traffic for that VoIP terminal passes through the mediating server 114.

Communications system 100 also includes a media gateway 120 and a media gateway controller 122. Media gateway 120 receives voice packets from the Internet protocol domain and translates them to a format, for example, Pulse Code Modulation (PCM), suitable for a public switched telephone network 108. Media gateway controller 122 receives signaling packets from the Internet protocol domain and translates that signaling to a protocol, for example, SS7-ISUP, suitable for a public switched telephone network 108.

In accordance with the present invention, a surveillance server 130 is coupled to an access router 112 of an Internet service provider. Preferably, a server 132 at a surveillance agency is coupled to the surveillance server 130. To facilitate surveillance of VoIP conversations, surveillance server 130 interacts with the access router 112 and the surveillance agency server 132, to receive VoIP communications and forward those communications to surveillance agency server 132, as discussed further below with respect to FIG. 2. Access router 112, surveillance server 130, and surveillance agency server 132 are preferably implemented with one or more processors programmed to implement specific functionality, as described herein and as is known in the art.

Figure 2:
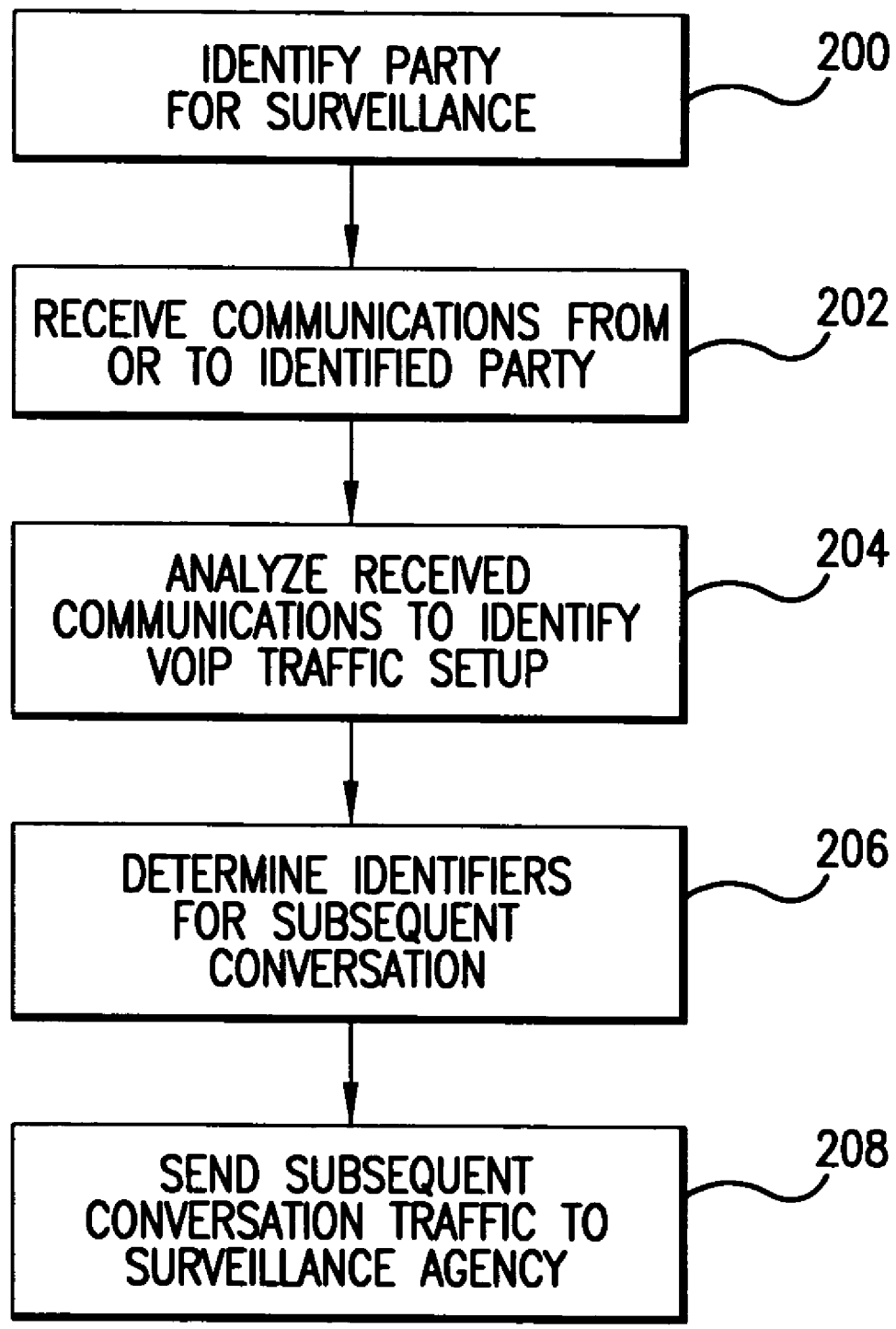
FIG. 2 is a flow chart illustrating a method for surveillance of voice over Internet protocol communications in accordance with the present invention.

FIG. 2 is a flowchart illustrating a method for monitoring VoIP calls in accordance with the present invention. The method is described below with reference to communications system 100, shown in FIG. 1.

First, the party for which surveillance is sought is identified (200). Typically, the law enforcement agency has some information to identify the party under surveillance. This information may include a phone number, a name, an address or other indicia. The Internet service provider for the party is then contacted to initiate the surveillance. In most cases, the Internet service provider must determine the computer identification for the party under surveillance. In accordance with the invention, this computer identification is provided to surveillance server 130 to alert the server to communications that should be monitored. The computer identification may vary over time and will vary with the type of system. For example, broadband Internet access, such as, for example, to a cable modem, may identify the subscriber by the MAC address of the cable modem. A dial-up service may identify the subscriber by a user ID. A DSL service may identify the subscriber by a phone number. In any event, after the computer identification is determined, communication with the access router may be necessary to determine specific communication packets associated with the party under surveillance. In other words, surveillance server 130 and an access router 112 of the Internet service provider of the party under surveillance must communicate and interact with each other such that the access router can uniquely identify all communications directed to or from the party under surveillance.

Once the communications to and from the party under surveillance are capable of identification, all of those communications are received for further analysis (202). Preferably, the access router 112 identifies the communications to and from the party under surveillance and forwards that traffic to the surveillance server 130. Preferably, surveillance server 130 analyzes the received communications to determine whether such traffic relates to a VoIP conversation (204).

To determine whether some traffic is VoIP traffic, the traffic is analyzed to determine whether it conforms to known standard protocols for VoIP. In particular, the traffic is analyzed to determine whether it conforms to an H.323 protocol or a SIP protocol or other VoIP protocols. The VoIP protocols have a call setup stage, wherein a message is sent to set up or initiate a call. For SIP the call setup message is an INVITE request. In H.323, the call setup is a SETUP request. Preferably, surveillance server 130 analyzes the traffic for the party under surveillance to determine whether a VoIP session is a being initiated through a call setup stage.

After a call setup stage is identified, subsequent traffic is analyzed for specific identifiers that allow further identification of all traffic associated with the VoIP conversations subsequent to the call setup stage (206). That is, information exchanged during the setup of VoIP calls is preferably used to identify subsequent data packets that relate to the calls. For example, a SIP INVITE request has a unique session identifier. In addition, the SIP INVITE request also contains the IP address and port number that should be used for receiving voice traffic for the VoIP call directed to the call originator. The response to the SIP INVITE request includes the unique session identifier and is identified accordingly. Also, the response to the SIP INVITE request includes the IP address and port number where the other party expects to receive voice traffic for the VoIP exchange. The IP addresses and port addresses identified in the SIP INVITE request and the response thereto are identifiers that can be used to identify subsequent packets associated with the VoIP call. In particular, monitoring of the identified IP addresses and port addresses by the access router 112 or surveillance server 130 provides a ready means to distinguish and identify all traffic associated with the VoIP calls for the party under surveillance.

Notably, the IP addresses and port addresses used for the VoIP exchange are typically addresses associated with the mediating server 114, rather that addresses associated with either terminal involved in the VoIP communication. This level of redirection in VoIP communications makes it difficult for law enforcement agencies to merely "sniff" Internet packets for select VoIP communications for particular parties. Hence, the need for the novel methods and apparatus disclosed herein.

Once the VoIP transmissions are identified, those communications are preferably sent to the surveillance agency server 132 (208). The surveillance agency server 132 may be manned or not. That is, there may be an operator available to hear such transmissions after they are reconstructed into voice in real-time or those communications may be stored for subsequent listening. Preferably, surveillance agency server 132 uses the content forwarded from surveillance server 130 to record the calling and called party and the time of the call. In addition, preferably, all call content is stored for the particular call. Other monitoring is possible, including an alert for real-time monitoring of conversations based on a call or calling party or the like.

The invention provides a means to effectively monitor VoIP communications associated with a particular party. Advantageously, the surveillance is not overly obtrusive, in that only communications of interest are subject to surveillance. On the other hand, the surveillance is effective, in spite of inherent redirection employed in VoIP communications.

Whereas the present invention has been described with respect to specific embodiments thereof, it will be understood that various changes and modifications will be suggested to one skilled in the art and it is intended that the invention encompass such changes and modifications as fall within the scope of the appended claims.

The invention claimed is:

1. A method for surveillance of voice over Internet protocol communications for a party, the method using a first server that provides Internet access to the party, the method comprising the steps of:

the first server receiving an identification of the party for which surveillance is sought;

the first server determining whether a network communication received by the server is from or directed to the party;

a second server receiving the network communication if the network communication is determined to be from or directed to the party;

the second server analyzing whether the network communication that is determined to be from or directed to the party is a voice over Internet protocol communication; and if the network communication is a voice over Internet protocol communication, then the second server sending the network communication and all subsequent related network communications to a surveillance server.

2. The method of claim 1 wherein the step of analyzing whether the network communication is a voice over Internet protocol communication further comprises the steps of:
determining whether the network communication conforms to a voice over Internet protocol;
if the network communication conforms to a voice over Internet protocol, then determining whether the network communication includes a call setup stage for the voice over Internet protocol;
if the network communication includes the call setup stage, then storing a first identifier that identifies subsequent network communications associated with the network communication.

3. The method of claim 2 further comprising the step of:
if the network communication includes the call setup stage, then receiving a response to the call setup stage, the response being identified in part by the first identifier; and
storing a second identifier included in the response.

4. The method of claim 3 wherein the step of sending the network communication and all subsequent related network communications to the surveillance server further includes the steps of:
determining whether any further network communications from or directed to the party include the first identifier or second identifier; and
sending further network communications with the first identifier or the second identifier to the surveillance server.

5. The method of claim 4 wherein the first identifier includes an IP address and a port number.

6. The method of claim 5 wherein the first identifier includes a unique session identifier.

7. The method of claim 6 wherein the second identifier includes an IP address and a port number.

8. The method of claim 1 wherein the first server and the second server are a same server.

9. The method of claim 2 wherein the call setup stage includes one of a SIP INVITE request and an H.323 setup request.

10. A server for surveillance of voice over Internet protocol communications for a party, the server providing Internet access to the party, the server comprising:
a processor that:
receives an identification of the party for which surveillance is sought;
determines a computer identity of the party for which surveillance is sought;
determines whether a network communication received by the server is from or directed to the party;
if the network communication received by the server is from or direct to the party, analyzes whether the network communication is a voice over Internet protocol communication; and
if the network communication is a voice over Internet protocol communication, then sends the network communication and subsequent related network communications to a surveillance server.

11. The server of claim 10 wherein when the processor analyzes whether the network communication is a voice over Internet protocol communication, the processor:
determines whether the network communication conforms to a voice over Internet protocol;
if the network communication conforms to a voice over Internet protocol, then determines whether the network communication includes a call setup stage for the voice over Internet protocol; and
if the network communication includes the call setup stage, then stores a first identifier that identifies subsequent network communications associated with the network communication.

12. The server of claim 11 wherein the processor:
if the network communication includes the call setup stage, then receives a response to the call setup stage, the response being identified in part by the first identifier; and
stores a second identifier included in the response.

13. The method of claim 12 wherein when the processor sends the network communication and subsequent related network communications to the surveillance server, the processor:
determines whether any further network communications from or directed to the party include the first identifier or second identifier; and
sends further network communications with the first identifier or the second identifier to the surveillance server.

14. The server of claim 13 wherein the first identifier includes an IP address and a port number.

15. The server of claim 14 wherein the first identifier includes a unique session identifier.

16. The method of claim 15 wherein the second identifier includes an IP address and a port number.

17. The method of claim 11 wherein the call setup stage includes one of a SIP INVITE request and an H.323 setup request.

* * * * *